United States Patent [19]

Zerkowitz

[11] Patent Number: 4,989,009
[45] Date of Patent: Jan. 29, 1991

[54] DIGITAL RANGE CORRELATOR

[75] Inventor: Avinoam Zerkowitz, Canoga Park, Calif.

[73] Assignee: Hughes Aircraft Company, Los Angeles, Calif.

[21] Appl. No.: 497,750

[22] Filed: Mar. 19, 1990

[51] Int. Cl.$^5$ .............................................. G01S 13/28
[52] U.S. Cl. ..................................... 342/145; 342/189
[58] Field of Search ................................. 342/145, 189

[56]  References Cited

U.S. PATENT DOCUMENTS

| | | | |
|---|---|---|---|
| 4,237,461 | 2/1980 | Cantrell et al. | 343/5 FT |
| 4,566,010 | 1/1986 | Collins . | |
| 4,758,839 | 7/1988 | Goebel et al. . | |
| 4,833,479 | 5/1989 | Carlson | 342/194 |

Primary Examiner—Nelson Moskowitz
Assistant Examiner—Mark Hellner
Attorney, Agent, or Firm—R. M. Heald; C. D. Brown; W. K. Denson-Low

[57] ABSTRACT

A digital range correlator is disclosed which provides a correlation scheme which can be mechanized and produced repeatedly with minimal need for offsets and reduced power supply sensitivity. CCDs are eliminated and the need for channel-to-channel matching is obviated. The digital correlator of the present invention includes an analog-to-digital converter for converting an input analog signal into a digital signal to provide a plurality of digital words one corresponding to each range gate. An accumulator is provided for summing the bits of each digital word to provide an accumulated sum for each range gate. The digital sums are compared in a processor to identify the range gate of the target. In a specific embodiment, the invention allows for the incorporation of a correlation code.

7 Claims, 1 Drawing Sheet

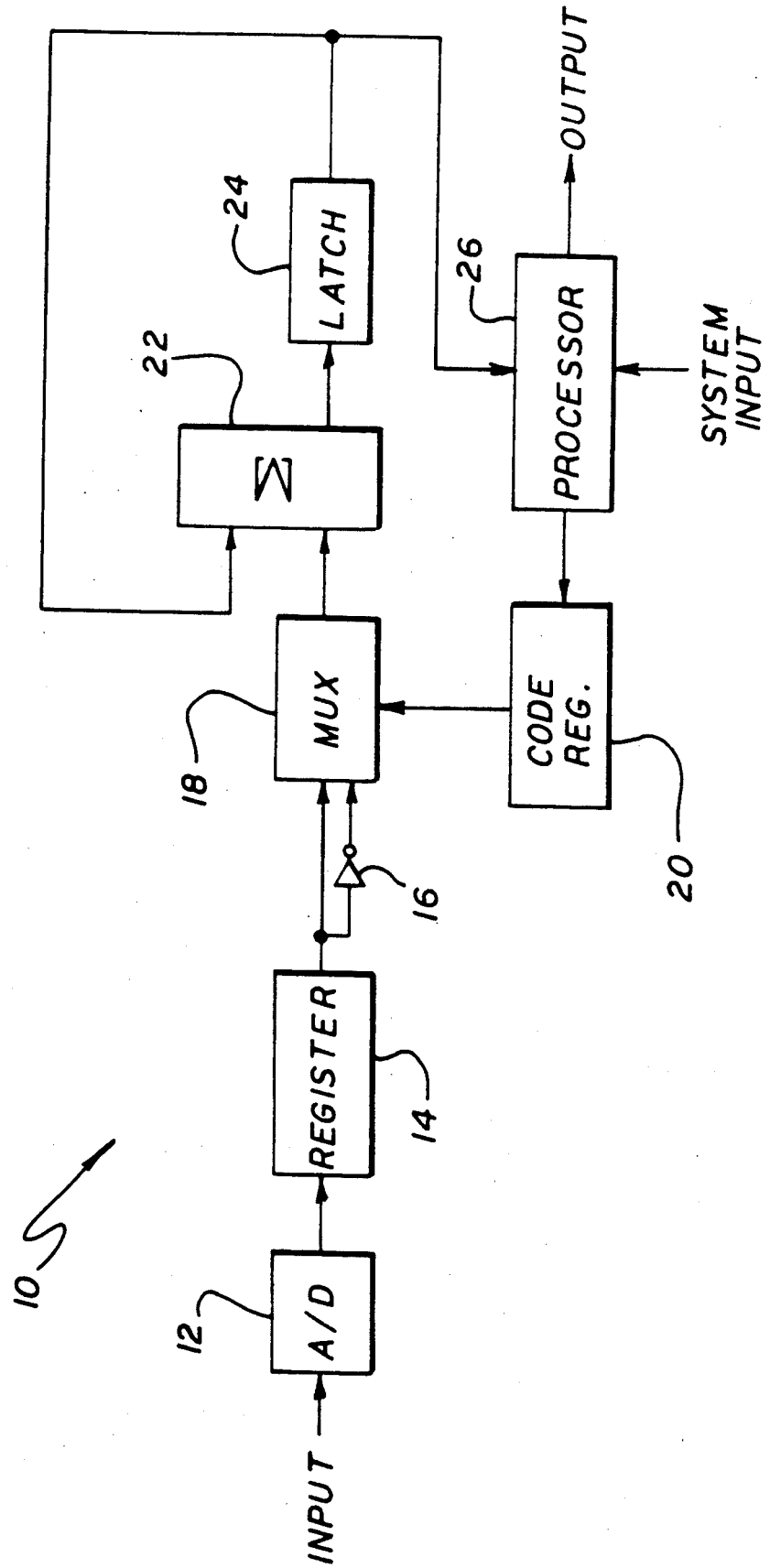

DIGITAL RANGE CORRELATOR

This invention was made with U.S. Government support under Contract No. F68635-86-C-0201, awarded by the Department of Air Force. The U.S. Government has certain rights in this invention.

This is a continuation Ser. No. 287,190, filed Dec. 20, 1988, now abandoned.

BACKGROUND OF THE INVENTION

1. Field of the Invention

The present invention relates to correlators. More specifically, the present invention relates to range correlators.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Range correlators generally provide an indication of range by timing the roundtrip delay of a transmitted pulse. In order to identify the return pulse, the returns are correlated with a known transmitted pulse. Many techniques are known in the art for performing the correlation. These techniques generally involve the digitizing of the return and the bit-by-bit matching thereof with a digitized representation of the transmitted pulse. The range bin with the best correlation provides the desired indication of range.

Time compression has been recognized as an advantageous correlation technique which is well adapted for range correlation. Time compression involves the transmission of a pulse, phase modulated in accordance with a correlation code, e.g., a Barker code. The return pulse is demodulated with the correlation code and the bits of each word of the resulting code are accumulated for each of a number of time slots, each time slot corresponding to a particular range bin. The time slot with the highest accumulated total is identified as corresponding to the range bin of the target.

Charge coupled devices (CCDs) are frequently used for time compression correlation. In a typical CCD correlator, analog samples of the return pulse are shifted one sample at a time through a register. The register is N bits long where N=code length. The signal returns either in phase or 180 degree out of phase for each PN code chip width. The N bits are all summed together, the 180 degree out of phase samples are inverted back to n-phase prior to summation. Since each register in the CCD corresponds to a time slot and hence a range bin, the register with the highest sum is associated with the target range bin.

CCDs provide fast sample and hold, and slow storage for correlation. Nonetheless, CCDs have been found to be somewhat problematic when used in correlators. The manufacture of CCDs is not easily repeatable. That is, CCDs are difficult to manufacture consistently. The operating characteristics of the devices are known to vary unpredictably and nonuniformly with temperature, voltage, frequency, code length, offsets, etc. from device to device. This makes it difficult to keep the devices within specification and exacerbates the critical matching of the devices required for optimum performance in a correlator. The net result is a high cost associated with the manufacture, implementation and operation of a CCD correlator.

Thus, there is a need in the art for a correlation system capable of performing time compression without the aforementioned shortcomings of CCD correlators.

SUMMARY OF THE INVENTION

The need in the art is addressed by the digital range correlator of the present invention. The invention provides a correlation scheme which can be mechanized and produced repeatedly with minimal need for offsets and reduced power supply sensitivity. CCDs are eliminated and the need for channel-to-channel matching is obviated.

The digital correlator of the present invention includes an analog-to-digital converter for converting an input analog signal into a digital signal to provide a plurality of digital words for each range gate. An accumulator is provided for summing the bits of each digital word to provide an accumulated sum for each range gate. The digital sums are compared in a processor to identify the range gate of the target. In a specific embodiment, the invention allows for the incorporation of a correlation code.

When implemented in LSI (large scale integrated circuit) technology, the present invention allows for a correlator with reduced size, power and cost and improved reliability and producibility relative to those designed in accordance with the teachings of the related art.

BRIEF DESCRIPTION OF THE DRAWINGS

The Figure is a block diagram of an illustrative embodiment of the digital range correlator of the present invention.

DESCRIPTION OF THE INVENTION

The Figure shows a block diagram of an illustrative embodiment of the digital range correlator 10 of the present invention. The correlator 10 includes an analog-to-digital converter 12 which digitizes an analog return pulse of a conventional radar system (not shown). The analog-to-digital (A/D) converter 12 provides an N m-bit digital words for each of a plurality of time slots (or range bins or gate), each word or sample, corresponding to a bit of the PN code by which the radar pulse was transmitted and each time slot corresponding to a respective range gate. Each digital word is sequentially stored in a shift register 14 m bits wide, where m corresponds to the resolution of the A/D converter 12, and N+(R−1) long, where R is the number of range bins. In the preferred embodiment, the output of the shift register 14 is provided to an inverter 16 and as a first input to a multiplexer (MUX) 18. A second input to the multiplexer 18 is provided by the output of the inverter 16. Thus, the first and second inputs to the multiplexer 18 are the true and complemented outputs of the shift register 14.

The output of the multiplexer 18 is controlled by the output of a second shift register 20. The second shift register provides storage for a correlation code and will hereinafter be referred to as the "code register". While any correlation code will suffice, a Barker code is particularly well suited for this application. Barker codes are well known in the art. In any event, the transmitted radar signal is modulated with the correlation code. For example, the phase of the transmitted radar pulse may be shifted 180 degrees with a bit code of logical "1" and zero degrees with a bit code of logical "0". The multiplexer 18 selects the true or complemented output of the shift register 14 depending on the code stored in the code register 20. The multiplexer 18 and the code register 20 thereby provide means for demodulating the digitized return pulse.

The output of the multiplexer 18 provides a first input to a conventional summing circuit 22. The output of the summing circuit 22 is stored in a latch 24. The output of the latch 24 is fed back to the summing circuit 22 and thus provides the second input thereof. The latch 24 is an m (plus addition overflow depending on code length) bit latch. For each range bin, each word stored in the latch 24 is summed with a decoded digitized return by the summing circuit 22. The process is repeated N times and the result is accumulated in the latch 24. The accumulated result is then accessed and stored by a processor 26. Data stored in the first register 14 is then shifted one range bin, under control of a conventional master clock (not shown), and the process is repeated. After data has been shifted through the shift register 14, the processor 26 identifies the range bin with the highest accumulated sum and outputs a signal corresponding thereto. The processor 26 is adapted to receive a system input and is connected to the code register 20 to facilitate a change in the correlation code by the system or the user.

Thus, a digital correlator has been described which includes an analog-to-digital converter for converting an input analog signal into a digital signal to provide a plurality of digital words for each range gate. An accumulator is provided for summing the bits of each digital word to provide an accumulated sum for each range gate. The digital sums are compared in a processor to identify the range gate of the target. In the illustrative embodiment, the invention allows for the incorporation of a correlation code. The invention practices the digital range correlation method for detecting a target including the steps of:

(a) converting an input analog signal into a digital signal to provide a plurality of digital words for each of a plurality of range gates each digital word including at least two bits;

(b) summing the digital words for each range gate to provide an accumulated sum for each range gate; and (c) comparing the accumulated sums to identify the range gate of the target.

When implemented in LSI (large scale integrated circuit) technology, the present invention allows for a correlator with reduced size, power and cost and improved reliability and producibility relative to those designed in accordance with the teachings of the related art.

The present invention has been described herein with reference to a particular embodiment for a particular application. Those having ordinary skill in the art and access to the teachings provided herein will recognize additional modifications, applications and embodiments within the scope thereof. For example, the invention is not limited to a Barker correlation code. Further, the function of the processor may be performed by a number of components and/or circuits other than a processor per se. Further, the invention is not limited to the techniques shown for demodulation of the return nor that shown for accumulating sums. It is therefore intended by the appended claims to cover any and all such applications, modifications and embodiments within the scope of the invention.

Accordingly,

What is claimed is:

1. A digital range correlator for detecting a target comprising: single analog-to-digital converter means for providing a plurality of digital words for each of a succession of range gates, each digital word including at least two bits;

accumulator means for summing the digital words in each range gate to provide an accumulated sum for each range gate; and processor means for storing and for comparing the accumulated sums in each range gate to identify the particular range gate associated with the target.

2. A digital range correlator for detecting a target comprising:

analog-to-digital converter means for providing a plurality of digital words for each of a succession range gates, each digital word including at least two bits;

first register means for storing the output of said analog-to-digital converter means, said first register including first and second outputs;

second register means for storing a predetermined code word;

multiplexer means having said first and second output of said first register as first and second inputs respectively and being controlled by the output of said second register for selectively providing said first and second inputs as the output thereof in response to the output of said second register;

Accumulator means for summing the digital words in each range gate to provide an accumulated sum for each range gate; and processor means for storing and for comparing the accumulated sums in each range gate to identify the particular range gate associated with the target.

3. The invention of claim 2 including latch means for storing the sum of the individual bits provided by said accumulator for access by said accumulator and said processor.

4. The invention of claim 1 wherein the output of said latch means is fed back to said accumulator and summed with the output of said multiplexer.

5. In a system for detecting a target, a digital range correlator:

analog-to-digital converter means for converting an input analog signal into a digital signal to provide a plurality of digital words, each word including at least two bits;

first register means for storing the output of said analog-to-digital converter means, including a means for providing first and second outputs from said first register means, said firs output being the true output of said first register means and said second output being the invertor output of said first register means;

means for demodulating said digital words with a predetermined code word, including second register means for storing said predetermined code word and multiplexer means having said first and second outputs of said first register as first and second inputs respectively and being controlled by the output of said second register for selectively providing said first and second inputs as the output thereof in response to the output of said second register;

accumulator means for summing the bits of each digital word to provide an accumulated sum for said first and second digital words;

latch means for storing the sum provided by the accumulator, the output of said latch means being fed back to said accumulator and summed with the output of said multiplexer; and processor means for comparing the accumulated sum to a number to identify a range gate associated with the target.

6. A method for providing digital range correlation including the steps of:

(a) providing first and second digital words, each including at least two bits and each corresponding to a range gate; and (b) comparing the digital words to identify the range gate associated with a target.

7. In a system for processing a radar return signal to identify a range gate associated with a target, a digital range correlator comprising:

accumulator means, said accumulator means having an input and an output, said output feedback coupled to said input, said accumulator means for summing a plurality of digital words to provide an accumulated sum for a range gate.

* * * * *